United States Patent [19]

Moriya

[11] 4,445,145

[45] Apr. 24, 1984

[54] VIDEO SIGNAL REPRODUCING APPARATUS

[75] Inventor: Ryusuke Moriya, Hadano, Japan

[73] Assignee: Sony Corporation, Tokyo, Japan

[21] Appl. No.: 317,906

[22] Filed: Nov. 3, 1981

[30] Foreign Application Priority Data

Nov. 7, 1980 [JP] Japan ............................ 55-157267

[51] Int. Cl.³ ...................... H04N 5/782; G11B 21/08
[52] U.S. Cl. ................................. 360/10.2; 360/10.3
[58] Field of Search ................... 360/10.1, 10.3, 11.1, 360/38.1; 358/312, 313, 314, 339

[56] References Cited

U.S. PATENT DOCUMENTS

| | | | |
|---|---|---|---|
| 4,215,362 | 7/1980 | Ravizza | 360/77 |
| 4,268,875 | 5/1981 | Morio et al. | 360/10.3 |
| 4,280,147 | 7/1981 | Baldwin | 360/10.3 |
| 4,287,538 | 9/1981 | Sakamoto et al. | 360/10.2 |
| 4,290,081 | 9/1981 | Foerster | 358/312 |
| 4,293,879 | 10/1981 | Heitmann et al. | 360/10.3 |
| 4,389,678 | 6/1983 | Mizukami et al. | 360/10.3 |

Primary Examiner—Donald E. McElheny, Jr.
Attorney, Agent, or Firm—Lewis H. Eslinger; Alvin Sinderbrand

[57] ABSTRACT

A video signal reproducing apparatus comprising an integrating drive circuit for controlling the position of a rotary magnetic reproducing head in the traverse direction of a skew recorded track formed on a magnetic tape, a trace control circuit for supplying a jump signal to the drive circuit which causes the magnetic head to jump to the beginning of a track to be traced next on completion of each tracing, a memory for storing the output signal from the magnetic head corresponding to at least one track tracing, and a memory reading and writing control circuit for writing the head output signal into the memory only when the jump signal is absent during slow-motion or still-picture reproduction, and for reading the stored head output out of the memory repetitively.

5 Claims, 9 Drawing Figures

VIDEO SIGNAL REPRODUCING APPARATUS

BACKGROUND OF THE INVENTION

1. Field of the Invention

This invention relates to video signal reproducing apparatus.

2. Description of the Prior Art

Reproducing apparatus of the type in which the position of a rotary head is controlled in the traverse direction relative to skew recording tracks formed on a magnetic tape can operate to correct an angular difference between a recording track and the scanning path of a reproducing head when reproducing at other than the normal forward speed. This occurs in modes such as slow-motion, still-picture, fast-motion and reverse-motion, in which the tape speed on reproducing is different from the tape speed on recording.

In slow-motion reproduction, there is multiple tracing in which the same track is traced several times. For such multiple tracing, the reproducing head must be moved quickly by one track pitch between the end and the beginning of the track. This is because the tape is wound askew at a predetermined angle around the peripheral surface of the rotary head drum, the end of each track being displaced by one track pitch in the axial direction of the drum relative to the beginning of that track, when the tape is stationary.

To achieve the required flyback or jump of the reproducing head, a sharp voltage pulse is applied to an electromechanical transducer which controls the head position. However, due to the transient response of the transducer, a ringing or vibration occurs in the reproduced video signal as the trace starts, and this sometimes results in degradation of the reproduced picture.

SUMMARY OF THE INVENTION

One object of the present invention is to provide a video signal reproducing apparatus in which such ringing or vibration is prevented.

Another object of the present invention is to provide a video signal reproducing apparatus in which the output signal from a magnetic head is stored in a memory only when a jump signal is not applied to a head position control means during slow-motion and still-picture reproduction.

According to the present invention there is provided a video signal reproducing apparatus comprising a head position control means for controlling the position of a rotary magnetic reproducing head in the traverse direction of a skew recorded track formed on a magnetic tape;

a trace control circuit for supplying a jump signal to the head position control means which causes the magnetic head to jump to the beginning of a track to be traced next on completion of each tracing;

a memory for storing the output signal from the magentic head corresponding to at least one tracing; and a memory reading and writing control circuit for writing the head output signal into the memory only when said jump signal is absent during slow-motion or still-picture reproduction, and for reading the stored head output out of the memory repetitively.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
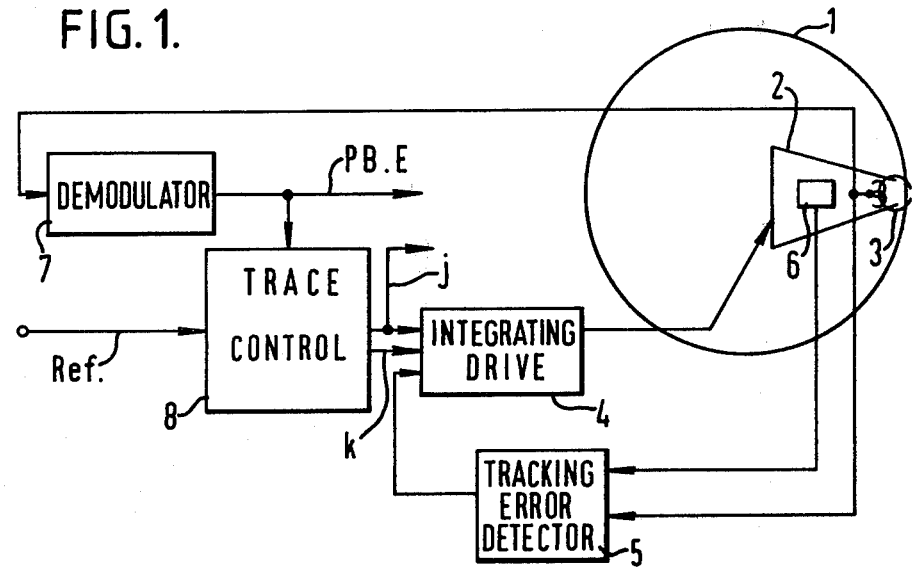
FIG. 1 is a block diagram of a head position control system for a video tape recorder in which an embodiment of the invention can be used.

FIG. 1 is a block diagram of a head position control system for a video tape recorder of the single head type or of the type having an auxiliary head (sometimes called a 1.5 head type), in which an embodiment of the invention can be used.

To a rotary head drum 1 of the video tape recorder is secured a bimorph plate 2, which is a lamination of two pieces of piezo-ceramic material. A rotary magnetic head 3 is mounted on the free end of the bimorph plate 2, which is supplied with a sinusoidal wave of 500 Hz to 1 KHz from an integrating drive circuit 4, so that the magnetic head 3 is vibrated across a recording track on a magnetic tape (not shown). Consequently, the envelope of the reproduced radio frequency output signal derived from the magnetic head 3 undergoes amplitude modulation.

By detecting the correlation between the amplitude modulation component and the sinusoidal wave causing the head vibration, the displacement of the magnetic head 3 relative to the track, that is the tracking error, can be detected. Thus, if the reproduced radio frequency output signal decreases as the magnetic head 3 swings in one direction across the track, it can be determined that the magnetic head 3 is moving away from the centre of the track in the direction of swing, and if the output signal increases, it can be determined that the magnetic head 3 is moving towards the centre of the track.

The output from the magnetic head 3 is supplied to a tracking error detector circuit 5, so that the tracking error is detected based on the abovementioned principle. The tracking error detector circuit 5 may, for example, be as disclosed in Japanese patent application No. 53/110174. An arangement may be provided such that the amplitude modulation component of the envelope of the reproduced radio frequency output signal is extracted, and then the modulation component and the output of a strain gauge 6 mounted on the bimorph plate 2 for sensing the head vibration are multiplied together, so that the magnitude and the polarity of the tracking error are determined.

The output of the tracking error detector circuit 5 is supplied to the integrating drive circuit 4, where the output is superimposed on the head vibration signal, which is then supplied to the bimorph plate 2 with a certain amplitude. The tracking error detecting circuit 5 may alternatively be arranged such that reference signals with different frequencies are recorded alternately or sequentially on each track, and the head position relative to the track, that is the tracking error, is determined based on the ratio of the reproduced level of these reference signals when the magnetic tape is reproduced.

The output of the magnetic head 3 is supplied to a demodulator 7 and demodulated to derive a reproduced video signal PB.E which is supplied to the video tape recorder processing circuit (not shown). The output of the demodulator 7 is also supplied to a trace control circuit 8 which produces a skew correction signal k for correcting the deviation of the head scanning path from the track for varied speed reproduction, and a head jump signal j for bringing the magnetic head 3, on completion of tracking of each track to the beginning of the track next to be traced.

The trace control circuit 8 may be as disclosed in Japanese patent application No. 53/110174 mentioned above, in which the skew correction signal k and the jump signal j are formed on the basis of the varying portion of the relative moving speed between the magnetic head 3 and the magnetic tape using the varied speed reproduced sync. signal.

Figure 2:
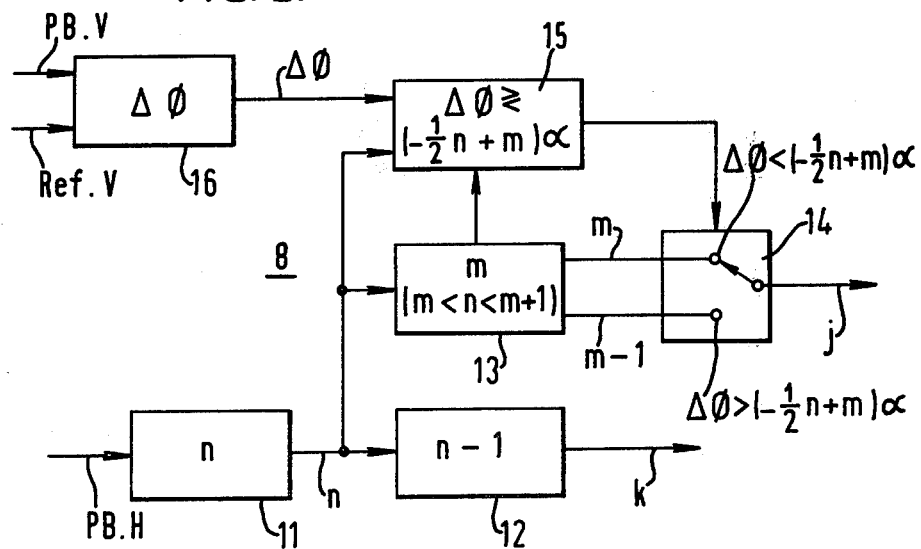
FIG. 2 is a block diagram of a trace control circuit shown in FIG. 1.

FIG. 2 is a block diagram of the trace control circuit 8 in FIG. 1. A horizontal sync. signal PB.H in the reproduced video signal PB.E is supplied to a frequency variation detector circuit 11, and the signal corresponding to the tape speed (with a speed multiplication ratio of n) is detected. For example, in double speed reproduction (n=2) of a 525 line television signal, the period of the reproduced horizontal sync. signal varies by the amount $\Delta H = +\alpha/262.5$ (where $\alpha$ is the horizontal sync. alignment value of the track), and the speed multiplication ratio n can be obtained by measuring the horizonal period with a counter.

The output of the frequency variation detector circuit 11 is supplied to an arithmetic operation circuit 12 which produces the skew correction signal k corresponding to the value of n−1. In double speed reproduction, for example, the skew of the head scanning path relative to the track differs by one track pitch (corresponding to n−1) from the case of normal speed reproduction; thus the difference of skew is corrected by applying the one track pitch skew voltage to the bimorph plate 2. The skew correction signal k from the arithmetic operation circuit 12 is supplied to the integrating drive circuit 4 in FIG. 1, is integrated and amplified with a predetermined time constant and gain, and is then supplied to the bimorph plate 2.

The speed multiplication ratio signal n is supplied to an m value detector circuit 13. This m is an integer with a relation to the n:

m is less than n is less than m+1 and an arbitrary n times speed reproduction is achieved by combination of m+1 times speed reproduction and m times speed reproduction. For example, when treble speed reproduction and double speed reproduction are carried out alternately, an averaged 2.5-times speed reproduction can be performed. For m+1 times speed reproduction, a head jump by m track pitches is required on each completion of tracking, and for m times speed reproduction, a head jump by m−1 track pitches is required. This is because the beginning and the end of a track are located one track pitch apart. The m value detector circuit 13 produces signals corresponding to the m pitch jump and the m−1 pitch jump, and one of these signals is selected by a selection switch 14, and supplied as the jump signal j to the integrating drive circuit 4 in FIG. 4. The signal is integrated with a very short time constant to form a jump voltage on completion of each tracing, and it is supplied to the bimorph plate 2.

Selection of the m jump or the m−1 jump is carried out based on the output of a jump determination circuit 15. The jump condition can be determined based on the output $\Delta\phi$ from a phase difference detector circuit 16 which provides the phase difference between a reproduced vertical sync. signal PB.V and a reference vertical sync. signal Ref. V. In double speed reproduction, for example, the reproduced horizontal period varies by the amount $\Delta H = +\alpha/262.5$ as mentioned previously, and therefore the reproduced vertical sync. signal PB.V will vary in its phase (or period) by the amount $\Delta V = +\alpha$. In general, the reproduction phase at a specific point on the track varies by $(n-1)\alpha$ for one tracing, due to the movement of the magnetic tape relative to the magnetic head 3 in n times speed reproduction. On the other hand, jumping of the magnetic head 3 by one track pitch causes the reproduction phase to vary by $+\alpha$. In general, an m−1 jump causes a $-(m-1)\alpha$ phase variation, and an m jump causes a $-m\alpha$ phase variation. Accordingly, the amount of phase variation on the specific point on the track during two consecutive tracings is expressed as the sum of the variation due to the tape movement and the variation due to the head jump as follows:

$\Delta = (n-m)\alpha$ is greater than or equal to 0, or $\Delta' = (n-m-1)\alpha$ is less than 0

$|\Delta| + |\Delta'| = \alpha$

The variation of the reproduction phase at the specific point on the track can be limited within a range $\alpha$ (within $\pm\alpha/2$) by an appropriate selection of $\Delta$ and $\Delta'$. The minimum variation of the reproduction phase at the beginning and the end of the track will occur when the specific point on the track is located at the centre of the track. The reproduction phase will vary by the amount of $\phi + \Delta$ or $\phi + \Delta'$ in the subsequent tracing, where $\phi$ is the reproduction phase relative to the reference phase at the track centre at an arbitrary time point. Thus an m−1 jump (corresponding to $\Delta$) should be carried out when it is anticipated that $\phi + \Delta$ does not exceed $+\alpha/2$ (or $\phi + \Delta'$ extends $-\alpha/2$), or an m jump (corresponding to $\Delta'$) should be carried out when it is anticipated that $\phi + \Delta$ exceeds $+\alpha/2$. This determination can be expressed as:

$\phi + \Delta$ is greater than or less than $+\alpha/2$ $\phi$ is greater than or less than $-n\alpha + (m+\frac{1}{2})\alpha$ Considering the phase difference between the reproduced vertical sync. signal PB.V and the reference signal Ref.V at the end of the track, the above equation should be modified with $+(n-1)\alpha/2$ (the phase variation between the track centre and the end). Thus, an m−1 jump should be carried out when:

$\Delta\phi$ is less than $-\frac{1}{2}n\alpha + m\alpha$ and an m jump should be carried out when:

$\Delta\phi$ is greater than $-\frac{1}{2}n\alpha + m\alpha$

In FIG. 2 the above determination is carried out by the jump determination circuit 15 based on the values of the n, m and $\Delta\phi$, and the selection switch 14 is switched in response to the output in the manner indicated.

Figure 3:
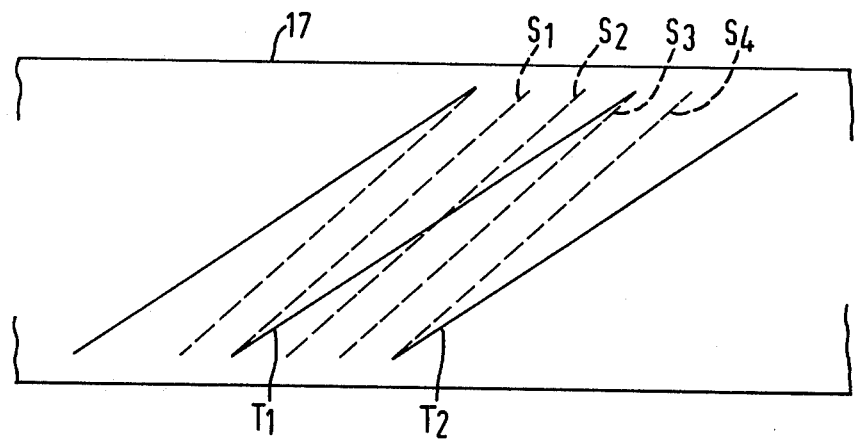
FIG. 3 is a diagram showing tracks (solid lines) and head scanning paths (dashed lines) during one-third speed reproduction.

FIG. 3 is a chart showing tracks T1, T2, ... (solid lines) and head scanning paths S1, S2, ... (dashed lines) on a magnetic tape 17 in the plus one-third speed (n=0.33) reproduction. FIG. 4 is a set of waveform charts showing the bimorph drive voltage and the reproduced radio frequency output.

Figure 4A:
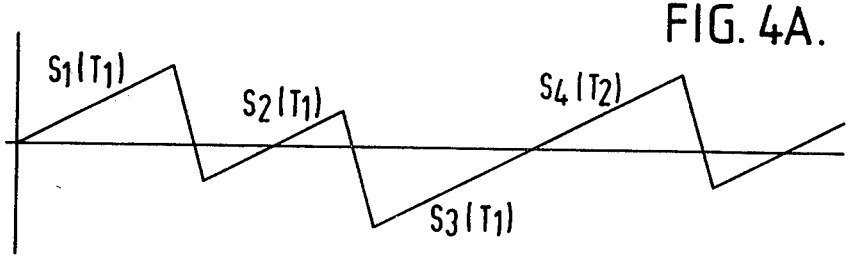
FIGS. 4A and 4B are waveforms showing the drive voltage to a bimorph plate shown in FIG. 1, and a reproduced radio frequency output signal from a magnetic head.

As shown in FIG. 3, head scanning paths S1, S2, ... have a skew error or $1\frac{1}{3} = \frac{2}{3}$ relative to tracks T1, T2, . . . In order to correct the skew error, a triangular skew correction voltage as shown in FIG. 4A is produced by the integrating drive circuit 4 in response to the skew correction signal k (that is n−1) from the trace control circuit 8, and supplied to the bimorph plate 2. At the point when the path S1 for the track T1 is complete, the magnetic head 3 is located at the beginning of the track T2, and in this case the head jump signal j of m=−1 pitch is produced by the trace control circuit 8. The jump signal j is integrated to produce a sharp jump voltage as shown in FIG. 4A, and it is applied to the bimorph plate 2 so that the magnetic head 3 is returned or flown back to the beginning of the track T1.

Similarly, for the traces S2 and S3, the same track T1 is scanned in alternative repetition for skew correction and jumping. For the fourth trace S4, the jump determination circuit 15 of FIG. 2 produces a jump signal j corresponding to m=0, so that the scanning track is switched to T2 for tracing rather than jumping, as shown in FIG. 4A. This operation is repeated and a slow-motion picture at one-third speed is obtained.

Figure 4B:
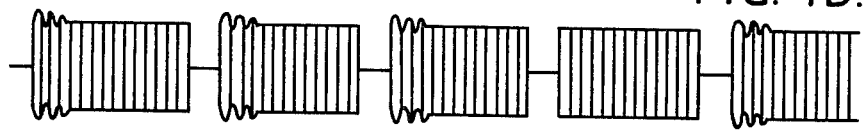

A head jump causes the bimorph plate 2 to have applied to it a sharp jump voltage, creating a ringing in the reproduced radio frequency output signal from the magnetic head 3 due to the transient vibration of the bimorph plate 2 as shown in FIG. 4B. This ringing causes a significant degradation of the reproduced picture, and in this embodiment, a slow-motion picture is produced by repeating the reproduced radio frequency signal without ringing, this being obtained in the trace S4 in FIG. 4A when the head jump does not occur.

Figure 5:
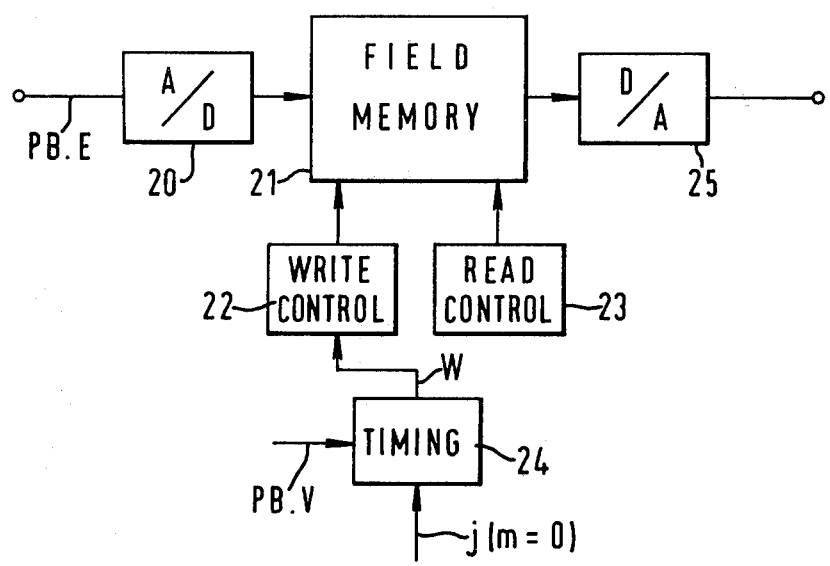
FIG. 5 is a block diagram of a reproduced signal processing circuit.
Figure 6A:
FIGS. 6A, 6B and 6C are a timing chart of the operation of the circuit of FIG. 5.
Figure 6B:

FIG. 5 is a block diagram of the video tape recorder reproduction signal processing circuit embodying the present invention, and FIG. 6 is a timing chart for explaining the operation of the processing circuit.

The reproduced video signal PB.E from the demodulator 7 (FIG. 1) is supplied to an analog to digital converter 20, the output of which is supplied to a field memory 21 having a storage capacity of one field period. The field memory 21 is controlled by a write control circuit 22 and a read control circuit 23, by which read and write operations are carried out in parallel.

Figure 6C:

When a jump signal j for m=0 as shown in FIG. 6, where head jump does not take place, but only the track scanned is altered, is produced by the trace control circuit 8 (FIG. 1), a timing circuit 24 in FIG. 5 receives this sigal, and a write command pulse W shown in FIG. 6C with a duration corresponding to one field period of the reproduced vertical sync. signal is produced. The pulse W is supplied to write control circuit 22 which forms address information supplied to the field memory 21. As a result, a reproduced video signal without ringing is written into the field memory 21. The contents of the field memory 21 are read out repetitively in response to address information supplied by the read control circuit 23. The output of the field memory 21 is supplied to a digital to analog converter 25, and transformed into the analog picture signal.

For the one-third speed reproduction, the field memory 21 is written-in (refreshed) once every four frames, and a slow motion reproduction picture without ringing is obtained. It should be noted that when the field memory 21 is not used, that is in previously proposed systems, one track is traced three times before switching to the next track for the one-third speed reproduction.

In addition to the foregoing embodiment, the invention can also be applied to a jump control system in which a head jump or flyback is carried out when the voltage applied to the bimorph plate 2 has reached a certain level so that the bimorph plate 2 is not bent beyond a maximum allowable amount.

For reproducing a still picture, the magnetic tape 17 continues to be transported even after the still picture command key has been operated, until the field memory 21 has been written-in, the same as described above when the jump signal with m=0 is detected. Then the magnetic tape 17 is stopped and the contents of the field memory 21 are read out repetitively to form a still picture.

Thus, as described above, the head output is written into the field memory 3 only when the head jump signal is absent (no jumping), and the memory contents are read out repetitively to produce a slow-motion picture or a still picture. Consequently, even if a residual vibration of the head position control means caused by the sharp jump voltage applied thereto during a head jump generates a ringing in the reproduced output, only the reproduced output without ringing is extracted, whereby a very high quality slow-motion picture or still picture can be formed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A video signal reproducing apparatus comprising:
   head position control means for controlling the position of a rotary magnetic reproducing head in the traverse direction of a skew recorded track formed on a magnetic tape;
   trace control means for supplying a jump signal to said head position control means which causes said magnetic head to jump to the beginning of a track to be tracked next on completion of each tracing, during reproduction at a speed different than that for recording;
   memory means for storing an output signal from said magnetic reproducing head corresponding to at least one said tracing; and
   memory reading and writing control means for writing said output signal into said memory means only when said trace control means does not supply said jump signal to said head position control means during slow-motion or still-picture reproduction when said reproduction speed is lower than that used for recording, and for repetitively reading said stored output signal out of said memory means.

2. Apparatus according to claim 1 wherein said trace control means further comprises a frequency variation detector circuit for determining a tape speed multiplication ratio n by measuring the horizontal period of said output signal and an arithmetic operation circuit for deriving a skew correction signal in response to said tape speed multiplication ratio n determined by said frequency variation detector circuit for supply to said head position control means and based on a ratio $n-1$ so as to control said magnetic head to correct for skew distortion during reproduction at a speed different than that used for recording.

3. Apparatus according to claim 2 wherein said trace control means further comprises an m-value detector circuit for deriving said jump signal having one of two values corresponding respectively to multiplication ratios m and $m+1$, where:

$$m \text{ is less than } n \text{ is less than } m+1,$$

and a phase difference detector means for selecting which of said values of said jump signal is to be supplied to said head position control means in dependence on the phase difference between a vertical sync. signal in said head output signal and a reference vertical sync. signal.

4. Apparatus according to claim 1 wherein one field of a television signal is recorded in each said track and said memory stores one said field.

5. Apparatus according to claim 1 wherein said head position control means is an integrating drive circuit for deriving a drive signal for supply to a bimorph plate on which said rotary head is mounted.

* * * * *